US007608345B2

(12) United States Patent
Bürger et al.

(10) Patent No.: US 7,608,345 B2

(45) Date of Patent: Oct. 27, 2009

(54) METHOD OF PRODUCING AN ALUMINIUM ALLOY BRAZING SHEET AND LIGHT BRAZED HEAT EXCHANGER ASSEMBLIES

(75) Inventors: Achim Bürger, Hoehr-Grenzhausen (DE); Scott W. Haller, Richmond, VA (US); Guy Laliberté, Trois-Riviéres (CA)

(73) Assignee: Aleris Aluminum Koblenz GmbH, Koblenz (DE)

( * ) Notice: Subject to any disclaimer, the term of this patent is extended or adjusted under 35 U.S.C. 154(b) by 573 days.

(21) Appl. No.: 11/246,960

(22) Filed: Oct. 11, 2005

(65) Prior Publication Data

US 2006/0105193 A1 May 18, 2006

Related U.S. Application Data

(60) Provisional application No. 60/619,774, filed on Oct. 19, 2004.

(51) Int. Cl.

| | |
|---|---|
| ***B32B 15/20*** | (2006.01) |
| ***F28F 21/08*** | (2006.01) |
| ***C22F 1/04*** | (2006.01) |
| ***B23K 35/28*** | (2006.01) |

(52) U.S. Cl. ....................... 428/654; 148/523; 148/535; 228/183; 228/235.3; 228/262.51; 29/890.054; 165/905

(58) Field of Classification Search ....................... None
See application file for complete search history.

(56) References Cited

U.S. PATENT DOCUMENTS

| | | | | |
|---|---|---|---|---|
| 3,966,506 | A * | 6/1976 | Mandigo et al. | 148/695 |
| 4,172,548 | A | 10/1979 | Nakamura | |
| 4,586,964 | A | 5/1986 | Finnegan et al. | |
| 4,735,867 | A | 4/1988 | Finnegan | |
| 4,761,267 | A | 8/1988 | Takeno et al. | |
| 4,906,534 | A * | 3/1990 | Bekki et al. | 428/654 |
| 5,041,343 | A | 8/1991 | Fortin et al. | |
| 5,125,452 | A * | 6/1992 | Yamauchi et al. | 165/133 |
| 6,129,143 | A * | 10/2000 | Hasegawa et al. | 165/133 |
| 6,294,272 | B2 | 9/2001 | Sontgerath et al. | |
| 6,764,558 | B2 | 7/2004 | Kucza et al. | |
| 7,226,669 | B2 * | 6/2007 | Benedictus et al. | 428/654 |
| 7,514,155 | B2 * | 4/2009 | Benedictus et al. | 428/654 |
| 2002/0056492 | A1 | 5/2002 | Kucza et al. | |
| 2003/0121572 | A1 | 7/2003 | Kucza et al. | |
| 2004/0028940 | A1 * | 2/2004 | Toyama et al. | 428/654 |
| 2005/0064226 | A1 * | 3/2005 | Benedictus et al. | 428/654 |
| 2005/0067066 | A1 * | 3/2005 | Tanaka et al. | 148/535 |
| 2005/0079376 | A1 * | 4/2005 | Benedictus et al. | 428/654 |
| 2008/0274367 | A1 * | 11/2008 | Kilmer et al. | 428/607 |

FOREIGN PATENT DOCUMENTS

| | | |
|---|---|---|
| EP | 0326337 | 8/1989 |
| JP | 61088987 | 5/1986 |
| JP | 3281761 | 12/1991 |
| WO | 03061962 | 7/2003 |
| WO | 03076677 | 9/2003 |

OTHER PUBLICATIONS

P. Sharples, "Aluminum Brazing Problems Due To Grain Size", Welding Journal, March No. 21, (1975).

SAE Technical Paper Series, Shigenori Yamauchi et al., "Development of Corrosion Resistant Brazing Sheet for Drawn Cup Type Evaporators, Part 1; Alloy Development"; pp. 1-8, (Mar. 1-5, 1993).

Henry (Hong) S. Yang et al., "Mechanisms of Liquid Film Migration (LFM) in Aluminum Brazing Sheet", 1997 Vehicle Thermal Management Systems Conference Proceedings, May 19-22,1997; pp. 649-658.

Margareta Nylen et al., "The Mechanism of Braze Metal Penetration by Migration of Liquid Films in Aluminum", 2000, Materials Science Forum, vols. 331-337, (2000) pp. 1737-1742, 2000 Trans. Tech Publications.

Shigenori Yamauchi et al., "Influence of Precipitate Dispersion on the Erosion of Lightly Deformed Brazing-Sheets", Science and Engineering of Light Metals, RASELM 1991, Tokyo, Japan, Oct. 1991, pp. 635-640.

International Congress Aluminum Brazing, A. Bürger et al., "Development of higher strength core alloys—potentials and limits", 1st International Congress Aluminium Brazing, Düsseldorf, May 10-12, 2000; pp. 1-10.

Ralph A. Woods, "Liquid Film Migration During Aluminum Brazing", 1997 Vehicle Thermal Management Systems Conference Proceedings (1997); pp. 639-648.

* cited by examiner

*Primary Examiner*—John J Zimmerman
(74) *Attorney, Agent, or Firm*—Novak Druce + Quigg LLP

(57) ABSTRACT

A method of producing an aluminium alloy brazing sheet for the manufacturing of light brazed assemblies, wherein said brazing sheet has good formability, combined with a low susceptibility to core penetration in the end annealed as-produced condition after stretching, forming and/or shaping and brazing are disclosed. Assemblies made according to the method are also disclosed.

52 Claims, 1 Drawing Sheet

METHOD OF PRODUCING AN ALUMINIUM ALLOY BRAZING SHEET AND LIGHT BRAZED HEAT EXCHANGER ASSEMBLIES

This claims the benefit of U.S. provisional patent application No. 60/619,774 filed Oct. 19, 2004, incorporated herein by reference in its entirety.

FIELD OF THE INVENTION

The present invention relates to a method of producing an aluminium alloy brazing sheet for the manufacturing of light brazed assemblies, wherein said brazing sheet has good formability, combined with a low susceptibility to core penetration in the end annealed as-produced condition after stretching, forming and/or shaping and brazing, the method comprising the steps of casting a core aluminium alloy of defined composition, homogenizing the core alloy, cladding the core alloy on one or both sides with a brazing alloy, hot rolling and/or cold rolling, and recrystallization annealing. The invention relates further to the use of the brazing sheet obtained by this method, to manufacture heat exchanger components such as evaporator plates, oil cooler plates, roll formed tube, welded tube, header plates, side plates and corrugated and/or stamped heat transfer fins.

DESCRIPTION OF THE RELATED ART

In the manufacturing of light brazed heat exchanger assemblies utilizing aluminium braze sheet products and commercial braze processes (i.e. CAB or non-corrosive flux brazing in a controlled furnace atmosphere, flux-less brazing including but not limited to vacuum and Ni, Fe or Co coated processes, etc.) the industry standard has trended to lower sheet thicknesses, requiring improved product performance characteristics such as formability, brazeability, strengths and corrosion resistance. In braze sheet products the phenomenon known as 'Liquid Film Migration' or LFM, causes deterioration in the overall performance of units such as evaporators, radiators, and heater cores, etc. In the art, the term "LFM" is also referred to as core dissolution or core erosion or core penetration, etc. Herein by the term core penetration depth we refer to all these terminologies. It is known that the sensitivity of a material to core penetration depth is relatively low in the fully annealed (O-temper) product, especially if the same full annealed product is used in a "slightly cold worked" condition. By the term "slight cold worked" conditions, we refer to the deformation resulting from industrial processes such as stamping, roll forming or tension levelling which are typically applied to produce components of heat exchangers such as evaporator or oil cooler core plates, folded tubes, and heat transfer fins. When a brazing sheet material is produced in the full annealed condition, consisting of a core alloy and an Al—Si braze alloy (one or two side clad), is deformed to form a product and subsequently subjected to a brazing cycle, the "slight cold work" appears to be sufficient to induce core penetration in the brazing sheet. If the core penetration progresses too far into the core alloy, then the brazeability, corrosion resistance, etc. of the material is significantly decreased, resulting in heat exchanger units with overall poor performance characteristics.

For brazing applications and specifically in response to the industry trends to further reduce the material thickness, the core alloy of a brazing sheet product requires a good combination of formability, core penetration, strength and corrosion resistance characteristics. It has been well defined in literature and the heat exchanger industry that materials with reduced amounts of core penetration provide for significant improvements in brazeability and corrosion resistance. The use of a non O-temper, such as H14-temper or H24-temper has also been suggested to reduce the susceptibility to core penetration. However, although these tempers effectively reduce the core penetration, formability and/or elongation in the as-produced condition of the brazing sheet product is often compromised. Other alternative processes such as light cold deforming process i.e.: tension levelling, or the use of a non-recrystallized surface layer are difficult to control in current industrial mass-production practices and therefore result in a compromise on reproducibility of the product.

P. Sharples explains in the paper "*Aluminium brazing problems due to grain size*" (Welding Journal, March 1975, No. 21) the effect of grain size of the core material to the corrosion resistance of the brazing sheet.

SAE Paper 930148 by S. Yamauchi et al., of March 1993 discloses in "*Development of corrosion resistant brazing sheet for drawn cup type evaporators, part I: Alloy development*" that the corrosion resistance of a brazing sheet is not only influenced by the chemical composition such as Mn, Mg or other impurities (Fe or Si) but also describes the phenomenon that the cold reduction of the brazing sheet before brazing has an influence on the average erosion depth in the core alloy. It is described that a brazing sheet has a high erosion resistance because its precipitate dispersion is controlled by an appropriate combination of the conditions of homogenization, hot rolling and annealing.

Furthermore, the paper by H. S. Jang and R. A. Woods "*Mechanisms of liquid film migration* (*LFM*) *in Aluminium brazing sheet*.", VTMS-3 Conference proceedings, SAE International, 1997, pp. 649-658, discloses a diffusion process of the silicon from the brazing alloy to the core alloy during brazing especially at those regions which are deformed during the shaping process of the brazing sheet, thereby inducing the formation of precipitate-rich grain boundaries, which form paths particularly liable to intergranular corrosion due to the significant difference in potential between the phases present and the aluminium matrix. Even though the brazing sheet is annealed, preferably to an O-temper condition, in order to fully recrystallize the core material and in order to prevent the formation of these grain boundaries, such brazing sheets are deformed before brazing in order to form assemblies such as heat exchangers wherein such deforming generates variable strain hardening places and variable formation of grain boundaries which are susceptible for the migration of silicon.

U.S. Pat. No. 4,586,964 discloses a process for producing a corrosion resistant aluminium composite sheet for roll forming and vacuum brazing, comprising the steps of cladding an aluminium based core material, rolling said product to form a sheet product, annealing said sheet product to a substantially strain free state and cold working the said annealed sheet product to a reduction of about 3 to about 20%.

U.S. Pat. No. 4,735,867 proposes the introduction of vanadium as an alloying element in order to enhance the corrosion resistance of the aluminium of the core material. Furthermore, it is disclosed to improve the corrosion resistance by the inclusion of a final cold work step to a reduction ranging from about 10% to about 20%. Such cold work step is done after a full annealing step to produce a product in a substantially strain free state. Thereafter, the brazing sheets are shaped and vacuum brazed according to conventional techniques.

U.S. Pat. No. 4,172,548 discloses a method of fluxless brazing for aluminium structures either in vacuum or in an inert gas atmosphere. It has been shown that silicon, magnesium or other elements of the brazing alloy may diffuse from the molten brazing alloy in the outer portions of the core material which was initially of the eutectic composition. It has also been shown that such migration appears more easily at the grain boundaries than in the grain itself.

U.S. Pat. No. 4,586,964 discloses a method for producing a brazing sheet for roll forming and vacuum brazing, wherein a composite sheet is annealed to a strain-free state after having been rolled to a thickness which is a critical amount greater than the final thickness. Following the annealing step, the sheet is cold worked to the desired thickness, the degree of reduction in this final step being within a critical range which provides the improvement in corrosion resistance to the final product after brazing. It is disclosed to cold work the annealed sheet product to a reduction of from about 3% to about 20%.

U.S. Pat. No. 6,764,558 discloses a method to manufacture a thin clad strip intended for the manufacture of brazed heat exchangers including a hot rolling step followed by cold rolling of the clad alloy to a thickness close to the final thickness, re-crystallization annealing the strip between 300° C. and 400° C. and strain hardening the annealed strip to obtain a permanent deformation between 2% and 10% and thereby the final thickness.

WO 03/061962-A1 discloses aluminium alloys and clad aluminium alloys, one or two sides, that have one discrete and a substantially continuous layer of unrecrystallized grains abutting the surface of the core sheet, which can be clad or not, wherein said layer has a thickness of at least 5 microns at all points and said layer comprises up to 20% by volume of said sheet or plate and for a braze clad the core erosion during a brazing cycle, as measured in a cross-sectional optical microscopy subsequent to the brazing cycle, is less than 20%. The process comprising, casting an ingot, optionally partially homogenizing said ingot, subjecting said ingot to machine and/or scalping treatments, optionally applying a cladding to one or both sides of said ingot, and preheating said ingot to a defined temperature, cold rolling to a thickness and annealing sufficient to recrystallize most of the grains and render the alloy soft enough to form the desired part.

WO 03/076677-A1 discloses a method for producing aluminium composite material for heat exchanger applications, wherein the core alloy is homogenized at 530° C. or higher for greater than 15 hours, followed by a hot rolling step to produce the clad alloy and cold rolling to an intermediate-anneal thickness. The product is then subject to an intermediate anneal to completely recrystallize the core material, followed by imparting a strain of 1 to 10% the product and thereby the final aluminium alloy composite material.

A problem of the described prior art techniques is that the final strain hardening processes (<10%), at current braze sheet product thicknesses and the partially unrecrystallized process are inherently difficult to control in current industrial mass-production practices, resulting in a compromise on reproducibility of the critical product characteristics. In the cases of the final strain hardening processes where higher levels of strain (>10%) are applied to improve the process repeatability, the formability of the product is significant reduced.

SUMMARY OF THE INVENTION

It is an object of the invention to provide a process for producing an AA3XXX type Al—Mn alloy sheet when used as a core alloy in brazing sheet wherein good formability characteristics are combined with a sufficiently low susceptibility to core penetration (LFM)—thereby maintaining a balance of good braze performance, strength and corrosion resistance as identified within the above described prior art documents.

It is another object of the present invention to provide a method of manufacturing brazing sheets which can be used to produce light brazed assemblies having less thickness, less weight and resulting in less production costs.

The method of producing an aluminium alloy brazing sheet according to the present invention comprises the steps of:

a.) casting a core aluminium alloy with the following composition (in weight percent):
  Cu: 0.06-1.25, Mn: 0.4-1.7, Mg: 0.6 max.,
  Si: 1.25 max., Zn: 0.4 max., Zr: 0.25 max.,
  Fe: 0.8 max., Ti: 0.3 max., Cr: 0.25 max.,
  the balance aluminium and incidental elements and impurities, typically <0.05 each, total <0.15, as a core material, b.) homogenization and/or preheat of the core alloys at temperatures of 490 to 610° C., with soaking times of 1 to 24 hours, followed by regular industrial scalping of the cooled, as-cast ingot surface, c1) cladding said core aluminium alloy, on one or two sides, with an Al—Si type brazing alloy to obtain a clad member with a cladding thickness ratio in the range of 3-20% per side, c2) alternatively cladding said core alloy one side with an Al—Si based brazing alloy with a cladding ratio of 3-20%, and cladding the opposite side with an aluminium alloy with a corrosion and/or erosion protective cladding ratio of 5-30% and having a composition selected from the group consisting of AA1xxx-, AA3xxx- and AA7xxx-series alloys, and preferably having the following composition (in weight percent): Cu 0.5 max., Mn 1.5 max., Mg 2.0 max., Si 1.0 max., Zn 4.0 max., Zr 0.25 max., Fe 0.8 max., Ti 0.3 max., Cr 0.25 max., In 0.25 max., the balance aluminium and incidental elements and impurities, typically each <0.05, total <0.15, d.) the clad alloy liner ingots are scalped, re-heated and hot rolled to the proper thickness to achieve the desired clad ratio when applied to the scalped core ingot. The clad ratios ranging from 5 to 25%, utilizing regular industrial braze clad ratio tolerances.

e.) the assembled clad/core combinations, herein referred to as composite assemblies, are then re-heated to temperatures of 400 to 490° C., with soaking times of 1 to 20 hours, f.) hot rolling and/or cold rolling said composite assemblies, to a first thickness, g.) recrystallization annealing said rolled composite assemblies between 250° C. and 450° C., up to 10 hours, typically utilizing industry regular batch and continuous anneal processes to obtain an annealed product, preferably such that the mean grain diameter of the recrystallized annealed braze sheet core alloy is less than about 60 μm as determined according the methods of ASTM standard E112-96e3, characterized by, the additional steps of, h.) strain hardening said annealed product to a second thickness with a deformation of between 10% and 40%, preferably between 15%-20%, to obtain a brazing sheet at a second thickness, and i.) end annealing said brazing sheet for 1 to 10 hours between 250° C. to 420° C., preferably 2 to 7 hours, and more preferably for 3 to 5 hours between 350° C. and 410° C., such that the end annealed product is substantially not recrystallized and the mean grain diameter achieved in the recrystallization anneal is maintained at less than about 60 μm, k) and preferably further end annealing said brazing product provide for an as-produced temper with elongation values of greater than 10%, more preferably greater than 15%, and with yield strengths greater than 80 MPa, and more preferably greater the 90 MPa.

It has been found that the combination of strain hardening the recrystallized annealed product and again end annealing the strain hardened brazing sheet results in a brazing sheet which has not only improved formability depending on the time and temperature of the end annealing step, but also reduce susceptibility to core penetration (LFM) and thereby providing the associated improvements in braze performance, strength and corrosion resistant.

To simulate the "slight cold worked" conditions and the deformation resulting from industrial processes such as stamping, roll forming, etc. used to produce components of heat exchangers such as evaporator or oil cooler core plates, folded tubes etc., the end annealed materials were stretched utilizing a standard tensile testing equipment with levels up to 8%. The core penetration depths (LFM) of the "slight cold worked" materials were measured as per the method described in FIG. 1, utilizing a simulated braze cycle with an ultimate temperature of 600° C. with a hold of 3 minutes at this temperature.

The core penetration depths (LFM) of the braze sheet produced according to the present invention are less than 40 μm and preferably less than 30 μm, as determined according to FIG. 1 and the above described method.

The post-braze mean grain diameters of the core alloys according to the present braze sheet invention and irrespective of the "slight cold work" are greater than 80 μm and more preferably greater than 90 μm.

The amount (in weight %) of copper in said core alloy is in a range of 0.06 to 1.25%, preferably in a range of 0.15 to 0.7%. Copper is a preferred hardening element which contributes to the mechanical resistance and strength but which must be carefully balanced with the manganese and magnesium content since the melting point of the core material is reduced by adding too much copper while the copper content must at the same time be balanced with regard to the corrosion resistance.

Manganese is an element for increasing the corrosion resistance and the strength of the core material. Since manganese adds to the mechanical strength without decreasing corrosion resistance (as opposed to copper) it has been found that the amount (in weight %) of manganese in the core alloy is preferably in a range of 0.6 to 1.5%.

Furthermore, the core alloy of the present invention contains preferably less than 0.25% magnesium, 0.8% silicon, 0.6% iron, and 0.25% titanium. A limited addition of zinc may have a beneficial effect on corrosion resistance, particularly for alloys with higher copper concentrations. Also titanium is known to have a beneficial influence on corrosion resistance. Anti-recrystallization elements such as zirconium, chromium, vanadium, hafnium and scandium should have a preferred content of each less than 0.15 (in weight %).

The amount (in weight %) of silicon in the brazing alloy is not very critical. The cladding alloy may be any aluminium alloy capable of flow under typical brazing conditions to form fillets at the contact points sufficient to produce a sturdy bond. Such alloys will generally contain silicon as the primary alloying element, preferably at a concentration ranging from 5 to 15%, and preferably 6.5-11%. In addition the brazing alloys may optionally contain Mg in a range of 0.15-2.0% and/or Zn in a range of 0.5-3.0%, and/or Cu up to 4%. Exemplary such alloys are those of the AA4xxx-series, for example 4004, 4043, 4045, 4047, 4104 or 4343.

In accordance with another preferred embodiment of the present invention the brazing sheet can further be improved by casting a multi-clad ingot aluminium alloy and/or producing a rolled multi-clad product, thereby using a composition as mentioned before as a centre core layer and a clad alloy such as an aluminium-manganese alloy composition like AA3xxx-type, AA7XXX type or pure aluminium of the AA1XXX-type as an inter layer, preferably with the addition of zinc, as an interlayer on one or both sides of the centre core layer, thereby forming a multi-clad core aluminium alloy, optionally homogenizing and/or pre-heating said multi-clad core aluminium alloy after casting and cladding said multi-clad core aluminium alloy with said Al—Si based brazing alloy to obtain an improved clad member.

Throughout the strain hardening step and the subsequent end annealing step it is possible to control the formability and the corrosion resistance of multi-clad aluminium alloy brazing sheets as desired. The assembly of another embodiment of the present invention includes an interlayer which is formed on at least one side of the core layer of the brazing sheet, said interlayer comprising either a sacrificial anode material which is less corrosion resistant than the core layer or a protective material which is more corrosion resistant than the core layer. This interlayer further enhances the corrosion resistance by forming a barrier layer to the silicon which tends to migrate into the core layer. Hence, according to a preferred assembly of the present invention said assembly is composed of four or five layered brazing sheets comprising a core layer, an interlayer on each side of the core layer and a clad layer on at least one interlayer.

The foregoing and other features and advantages of the method and the brazing sheet according to the present invention will become readily apparent from the following detailed description of different examples.

EXAMPLES

Figure 1:
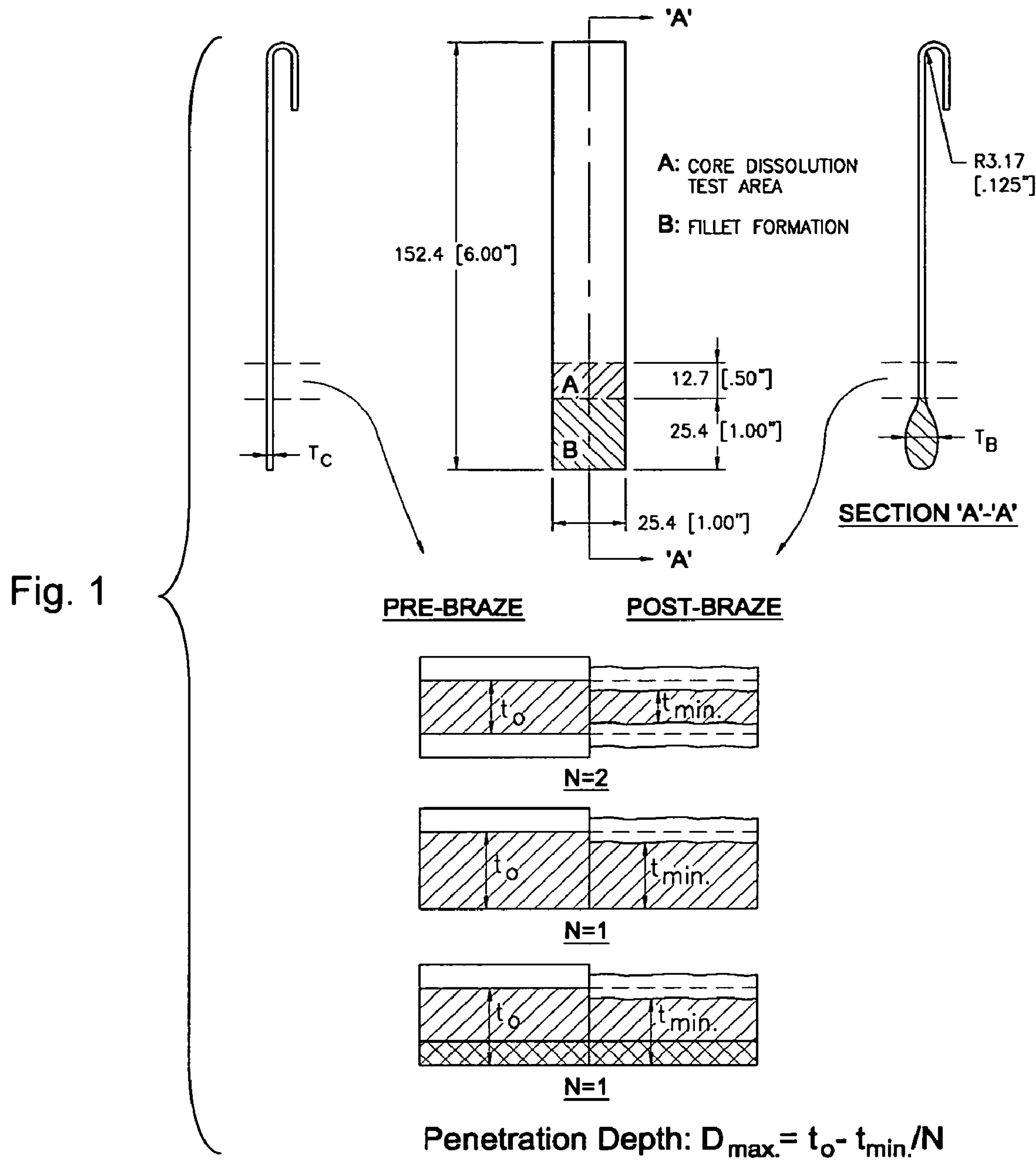
FIG. 1 shows schematically the laboratory sample configuration, metallographic sampling locations and the method of determining the core penetration depth (LFM) for a two side braze clad and various one side braze clad sheet products.

Utilizing regular industrial scale DC-casting six different core aluminium alloys and seven different Al—Si braze clad ingots were produced. The chemical compositions are listed in Table 1, where materials were chosen to represent applications for the manufacture of exchanger using flux brazing techniques such as Nocolok® as well as fluxless techniques such as vacuum brazing.

TABLE 1

Chemical composition of the standard industrial cast core and clad aluminium alloys, in weight-%, the balance being Aluminium and inevitable impurities.

| | Alloy | Si | Fe | Cu | Mn | Mg | Zn | Zr | Cr | Bi | Ti |
|---|---|---|---|---|---|---|---|---|---|---|---|
| A | Core | 0.06 | 0.23 | 0.51 | 1.04 | 0.002 | 0.004 | — | — | — | 0.15 |
| | Clad 1 & 2 | 9.7 | 0.24 | 0.002 | 0.005 | 0.002 | 0.003 | — | — | — | 0.003 |
| B | Core | 0.10 | 0.38 | 0.59 | 0.87 | 0.003 | 0.010 | 0.022 | 0.029 | — | 0.083 |
| | Clad 1 & 2 | 9.9 | 0.27 | 0.002 | 0.005 | 0.002 | 0.009 | — | — | — | 0.004 |
| C | Core | 0.078 | 0.26 | 0.65 | 0.47 | 0.089 | 0.009 | — | — | 0.004 | 0.19 |
| | Clad 1 & 2 | 9.8 | 0.4 | 0.02 | 0.06 | 1.4 | 0.01 | — | 0.01 | 0.09 | 0.01 |
| D | Clad 1 | 9.7 | 0.22 | 0.003 | 0.008 | 0.003 | 0.97 | — | 0.004 | — | 0.008 |
| | Core | 0.04 | 0.14 | 0.54 | 0.99 | 0.005 | 0.007 | 0.033 | — | — | 0.097 |
| | Clad 2 | 10.1 | 0.34 | 0.004 | 0.01 | 0.006 | 0.025 | — | 0.006 | — | 0.022 |
| E | Core | 0.055 | 0.22 | 0.56 | 0.83 | 0.17 | 0.006 | — | — | — | 0.096 |
| | Clad 1 & 2 | 11.3 | 0.15 | 0.004 | 0.004 | 0.16 | 0.033 | — | 0.004 | — | 0.002 |
| F | Clad 1 | 10.1 | 0.34 | 0.004 | 0.01 | 0.006 | 0.025 | — | 0.006 | — | 0.022 |
| | Core | 0.07 | 0.21 | 0.53 | 1.10 | 0.002 | — | — | — | — | 0.15 |
| | Clad 2 | 10.1 | 0.25 | 0.003 | 0.011 | 0.006 | 1.03 | — | 0.005 | — | 0.008 |
| G | Clad 1 | 10.1 | 0.34 | 0.004 | 0.01 | 0.006 | 0.025 | — | 0.006 | — | 0.022 |
| | Core | 0.07 | 0.26 | 0.49 | 1.00 | 0.002 | — | — | — | — | 0.14 |
| | Clad 2 | 10.1 | 0.25 | 0.003 | 0.011 | 0.006 | 1.03 | — | 0.005 | — | 0.008 |
| H | Clad 1 & 2 | 7.4 | 0.75 | 0.002 | 0.007 | 0.002 | 0.97 | — | 0.004 | — | 0.009 |
| | Core | 0.24 | 0.58 | 0.13 | 1.12 | 0.002 | 1.49 | — | 0.007 | — | 0.012 |

The above clad and core alloys were subjected to industrial standard process routes to produce two side clad braze sheet products, consisting of homogenization of the core alloys A to G at temperatures of 490 to 610° C., with soaking times of 1 to 20 hours, followed by regular industrial scalping of the cooled, as-cast ingot surface. Note core alloy H was not given a homogenization treatment. The clad alloy liner ingots scalped, re-heated and hot rolled to the proper thickness to achieve the desired clad ratio when applied to the scalped core ingot. The braze clad ratios for the example materials ranged from 8 to 18%, utilizing regular industrial braze clad ratio tolerances. The assembled clad/core combinations, herein referred to as “composite assemblies”, were then re-heated to temperatures of 430 to 490° C., with soaking times of 1 to 20 hours and hot rolled to bond the clad alloys to the core materials. The hot rolled and subsequently cold rolled “composite assemblies” were then further processed to obtain standard recrystallization annealed, O-temper products, at temperatures of 250 to 450° C., with anneal times up to 10 hours, utilizing either batch or continuous anneal type heat up rates. Finally materials incorporating comparative and the inventive process were further cold rolled and final annealed according to the parameters described in Table 2.

TABLE 2

Alloys of Table 1 - Process Route Identification

| Alloy-Process # | Description | Recrystal-lization Anneal (° C.) | Cold Work Level (%) | Final Anneal (° C.) | Final Gauge (mm) |
|---|---|---|---|---|---|
| A1 | Standard | 379 - 5 Hours | - | - | 0.52 |
| A2 | Inventive | 379 - 5 Hours | 15 | 357 - 5 Hours | 0.44 |
| A3 | Inventive | 379 - 5 Hours | 20 | 413 - 5 Hours | 0.42 |
| A4 | Inventive | 379 - 5 Hours | 15 | 357 - 5 Hours | 0.44 |
| A5 | Comparative | 379 - 5 Hours | 20 | 413 - 5 Hours | 0.42 |
| A6 | Inventive | 379 - 5 Hours | 15 | 377 - 5 Hours | 0.44 |
| B1 | Standard | 379 - 5 Hours | - | - | 0.50 |

TABLE 2-continued

Alloys of Table 1 - Process Route Identification

| Alloy-Process # | Description | Recrystal-lization Anneal (° C.) | Cold Work Level (%) | Final Anneal (° C.) | Final Gauge (mm) |
|---|---|---|---|---|---|
| B2 | Inventive | 379 - 5 Hours | 15 | 357 - 5 Hours | 0.43 |
| B3 | Inventive | 379 - 5 Hours | 20 | 413 - 5 Hours | 0.40 |
| B4 | Inventive | 379 - 5 Hours | 15 | 357 - 5 Hours | 0.43 |
| B5 | Inventive | 379 - 5 Hours | 20 | 413 - 5 Hours | 0.40 |
| B6 | Inventive | 379 - 5 Hours | 15 | 377 - 5 Hours | 0.43 |
| C1 | Standard | 379 - 5 Hours | - | - | 0.50 |
| C2 | Inventive | 379 - 5 Hours | 15 | 357 - 5 Hours | 0.43 |
| C3 | Inventive | 379 - 5 Hours | 20 | 413 - 5 Hours | 0.40 |
| C4 | Inventive | 379 - 5 Hours | 15 | 357 - 5 Hours | 0.43 |
| C5 | Inventive | 379 - 5 Hours | 20 | 413 - 5 Hours | 0.40 |
| D1 | Inventive | 379 - 5 Hours | 18 | 357 - 5 Hours | 0.40 |
| D2 | Inventive | 379 - 5 Hours | 18 | 371 - 5 Hours | 0.40 |
| D3 | Inventive | 379 - 5 Hours | 18 | 385 - 5 Hours | 0.40 |
| D4 | Inventive | 379 - 5 Hours | 18 | 399 - 5 Hours | 0.40 |
| D5 | Inventive | 379 - 5 Hours | 18 | 413 - 5 Hours | 0.40 |
| D6 | Comparative | 379 - 5 Hours | 18 | 427 - 5 Hours | 0.40 |
| D7 | Comparative | 379 - 5 Hours | 18 | 440 - 5 Hours | 0.40 |
| E1 | Standard | 379 - 5 Hours | - | - | 0.50 |
| E2 | Inventive | 379 - 5 Hours | 18 | 413 - 5 Hours | 0.50 |
| F | Inventive | 413 - 3 Hours | 18 | 385 - 5 Hours | 0.40 |
| G1 | Inventive | 379 - 5 Hours | 18 | 379 - 5 Hours | 0.40 |
| G2 | Inventive | 379 - 5 Hours | 18 | 399 - 5 Hours | 0.40 |
| H | Standard | 413 - 3 Hours | - | - | 0.40 |

The mechanical properties of thus treated clad alloys in the as-produced or final annealed temper condition are given in Table 3. The mean grain diameter was determined as described above according to ASTM Standard E112-96e3.

TABLE 3

As-produced mechanical properties and mean grain diameters of the alloys of Table 1, processed according to Table 2.

| Alloy-Process# | Description | Tensile Strength (MPa) | Yield Strenghth (MPa) | Elongation (%) | Mean Grain Diameter (um) |
|---|---|---|---|---|---|
| A1 | Standard | 141 | 59 | 26 | 44 |
| A2 | Inventive | 148 | 97 | 17 | 46 |
| A3 | Inventive | 150 | 101 | 16.5 | 46 |
| A4 | Inventive | 153 | 93 | 21 | 47 |
| A5 | Comparative | 149 | 69 | 16 | 143 |
| A6 | Inventive | 147 | 93 | 21 | — |
| B1 | Standard | 134 | 61 | 23 | 57 |
| B2 | Inventive | 153 | 103 | 17 | 52 |
| B3 | Inventive | 144 | 91 | 19 | 61 |
| B4 | Inventive | 141 | 81 | 17.5 | 55 |
| B5 | Inventive | 146 | 89 | 19 | 64 |
| B6 | Inventive | 142 | 82 | 22.5 | — |
| C1 | Standard | 138 | 67 | 23 | 49 |
| C2 | Inventive | 154 | 99 | 15 | 47 |
| C3 | Inventive | 149 | 92 | 17.5 | 43 |
| C4 | Inventive | 151 | 87 | 15.5 | 45 |
| C5 | Inventive | 153 | 89 | 17.5 | 41 |
| D1 | Inventive | 154 | 105 | 17 | 42 |
| D2 | Inventive | 155 | 105 | 17 | 37 |
| D3 | Inventive | 156 | 104 | 17 | 40 |
| D4 | Inventive | 154 | 103 | 17 | 38 |
| D5 | Inventive | 154 | 97 | 19 | 42 |
| D6 | Comparative | 148 | 75 | 18 | 92 |
| D7 | Comparative | 146 | 73 | 17 | 113 |
| E1 | Standard | 146 | 63 | 21 | 43 |
| E2 | Inventive | 161 | 105 | 15 | 48 |
| F | Inventive | 149 | 100 | 20 | 38 |
| G1 | Inventive | 149 | 103 | 19 | 43 |
| G2 | Inventive | 146 | 99 | 19 | 57 |
| H | Standard | 143 | 70 | 20 | 185 |

Materials in the as-produced condition where then given a simulated "slight cold work" treatment by stretching as described above 2 to 8% and brazed as per FIG. 1 at 600° C. for 3 minutes.

TABLE 4

Core penetration measurements as per the method described in FIG. 1.

| Alloy- | | Stretch Level (%) - $D_{max}$ (Core Penetration - μm) | | | | |
|---|---|---|---|---|---|---|
| Process # | Description | 0 | 2 | 4 | 6 | 8 |
| | Standard | 12.5 | 40 | 70 | 41 | 18 |
| A2 | Inventive | 17 | 15.5 | 17 | 12 | 16 |
| A3 | Inventive | 17 | 14 | 16 | 13 | 15 |
| A4 | Inventive | 25 | 11 | 15.5 | 14.5 | 17 |
| A5 | Comparative | 32 | 46.5 | 59 | 24 | 20.5 |
| A6 | Inventive | 19 | 21 | 22.5 | 32.5 | — |
| B1 | Standard | 26 | 77.5 | 88 | 42.5 | 30.5 |
| B2 | Inventive | 11 | 16 | 13 | 10 | 13 |
| B3 | Inventive | 17 | 20 | 14 | 11 | 14 |
| B4 | Inventive | 15 | 11 | 16 | 14.5 | 19 |
| B5 | Inventive | 16 | 11 | 13 | 14 | 16 |
| B6 | Inventive | 26 | 23.5 | 20 | 17 | — |
| C1 | Standard | 12 | 20.5 | 59 | 30 | 10.5 |
| C2 | Inventive | 17 | 10.5 | 16.5 | 12.5 | 15 |
| C3 | Inventive | 17 | 22.0 | 11.6 | 18 | 19 |
| C4 | Inventive | 15 | 11.5 | 17 | 15 | 16 |
| C5 | Inventive | 13.5 | 17 | 10 | 17.5 | 13.5 |
| D1 | Inventive | 17 | 24.5 | 30 | 24 | 10.5 |
| D2 | Inventive | 27.5 | 27 | 22.5 | 13.5 | 17.5 |
| D3 | Inventive | 16 | 14.5 | 23 | 9.5 | 15.5 |
| D4 | Inventive | 27 | 25 | 22 | 17.5 | 15.5 |
| D5 | Inventive | 12.5 | 10.5 | 13 | 11 | 14.5 |
| D6 | Comparative | 33.5 | 35 | 66.5 | 42 | 20.5 |

TABLE 4-continued

Core penetration measurements as per the method described in FIG. 1.

| Alloy- | | Stretch Level (%) - $D_{max}$ (Core Penetration - μm) | | | | |
|---|---|---|---|---|---|---|
| Process # | Description | 0 | 2 | 4 | 6 | 8 |
| D7 | Comparative | 28.5 | 30 | 71.5 | 40 | 27 |
| E1 | Standard | 38 | 62 | 56.5 | 43 | 31.5 |
| E2 | Inventive | 24.5 | 26.5 | 27.5 | 23.5 | 21.5 |
| F | Inventive | 21.5 | 22 | 27.5 | 15.5 | 16 |
| G1 | Inventive | 23 | 18.5 | 20.5 | 18.5 | 17.5 |
| G2 | Inventive | 21 | 24.5 | 24.5 | 15 | 14.5 |
| H | Standard | 19 | 51 | 81 | 94 | 99 |

Materials in the as-produced temper/condition were subject to a brazing cycle, 600° C. for 3 minutes and the associated mechanical properties and mean grain diameters determined.

TABLE 5

Post-Braze mechanical properties and post-braze mean grain diameters determined from samples brazed in the as-produced temper/condition.

| Alloy-Process# | Description | Tensile Strength (MPa) | Yield Strength (MPa) | Elongation (%) | Mean Grain Diameter (um) |
|---|---|---|---|---|---|
| A1 | Standard | 128 | 48 | 17 | 62 |
| A2 | Inventive | 129 | 50 | 12 | 226 |
| A3 | Inventive | 125 | 46 | 14.5 | 190 |
| A4 | Inventive | 126 | 45 | 16 | 210 |
| A5 | Inventive | 125 | 48 | 17 | 135 |
| A6 | Inventive | 131 | 54 | 13 | 113 |
| B1 | Standard | 132 | 53 | 12 | 56 |
| B2 | Inventive | 128 | 51 | 12 | 226 |
| B3 | Inventive | 130 | 51 | 14 | 190 |
| B4 | Inventive | 128 | 48 | 11 | 226 |
| B5 | Inventive | 135 | 52 | 21 | 190 |
| B6 | Inventive | 137 | 52 | 21 | 160 |
| C1 | Standard | 136 | 53 | 19 | 49 |
| C2 | Inventive | — | — | — | 113 |
| C3 | Inventive | — | — | — | 95 |
| C4 | Inventive | — | — | — | 135 |
| C5 | Inventive | — | — | — | 110 |
| D1 | Inventive | — | — | — | 190 |
| D2 | Inventive | — | — | — | 134 |
| D3 | Inventive | — | — | — | 160 |
| D4 | Inventive | 129 | 50 | 14 | 134 |
| D5 | Inventive | — | — | — | 95 |
| E1 | Standard | 146 | 63 | 21 | 43 |
| E2 | Inventive | 129 | 50 | 16 | 182 |
| F | Inventive | 127 | 49 | 15 | 213 |
| G1 | Inventive | 129 | 52 | 15.5 | 96 |
| G2 | Inventive | 128 | 55 | 14 | 139 |
| H | Standard | 141 | 66 | 10.5 | 205 |

The results of the example evaluation clearly show that by applying the inventive process to an AA3XXX Al—Mn type core alloy of a brazing sheet product that an as-produced product exhibiting elongation values greater than 10% or even 15% are achievable, with core mean grain diameters less than about 60μm. The combination of elongation and a fine as-produced grain structure providing the desired good formability characteristics of the invention. All the materials meeting these criteria were also found to have core penetration depths (LFM) after stretching up to 8%, brazing and per FIG. 1—less than about 30 μm. All these inventive products were also found to have post-brazed mean grain diameters greater than about 80 μm, when brazed in the as-produces temper/condition with no additional stretching and/or "slight cold work" being applied. The results confirmed that the strain hardening step and the final end annealing process need to be combined and/or controlled to insure that the product does not recrystallize during the final end anneal and that the fine grain structure established in the recrystallization anneal is maintained.

Having now fully described the invention, it will be apparent to one of ordinary skill in the art that many changes and modifications can be made without departing from the spirit or scope of the invention as hereon described.

The invention claimed is:

1. A method of producing an aluminium alloy brazing sheet for the manufacturing of a light brazed assembly, wherein said brazing sheet has good formability, combined with a low susceptibility to core penetration in the end annealed as-produced condition after stretching, forming and/or shaping and brazing, comprising the steps of:

a) casting a core aluminium alloy consisting essentially of the following composition (in weight percent):
Cu: 0.06-1.25, Mn: 0.4-1.7, Mg: 0.6 max.,
Si: 1.25 max., Zn: 0.4 max., Zr: 0.25 max.,
Fe: 0.8 max., Ti: 0.3 max., Cr: 0.25 max.,
the balance aluminium and incidental elements and impurities as a core material, b) homogenization and/or preheat of said core alloy at temperatures of 490 to 610° C., with soaking times of 1 to 24 hours, c) cladding said core aluminium alloy, on one or two sides, with an Al—Si based brazing alloy to obtain a clad member with a cladding thickness ratio in the range of 3 to 20% per side to make an assembly, and re-heating the assembly to temperatures of 400 to 490° C., with soaking times of 1 to 20 hours, d) hot rolling and/or cold rolling said assembly, to a first thickness, e) recrystallization annealing said rolled assembly at the first thickness between 250° C. and 450° C. for up to 10 hours, f) strain hardening said annealed product to a second thickness with a deformation of between 12% and 40% to obtain a brazing sheet product at a second thickness, and g) end annealing said brazing sheet at the second thickness for 3 to 5 hours between 350° C. to 420° C., such that the end annealed product is not recrystallized and the mean grain diameter provided by the recrystallization anneal is maintained at less than about 60 μm.

2. The method according to claim 1, wherein said brazing sheet in the end annealed condition and after stretching, forming and/or shaping and brazing, has a core penetration (LFM) depth of less than 40 μm.

3. The method according to claim 1, wherein said brazing sheet in the end annealed condition and after stretching, forming and/or shaping and brazing has a core penetration (LFM) depth of less than 30 μm.

4. The method according to claim 1, comprising said strain hardening of the recrystallized annealed product to the second thickness with deformation between 12% and 25%.

5. The method according to claim 1, comprising said strain hardening of the recrystallized annealed product to the second thickness with deformation between 15% and 20%.

6. The method according to claim 1, comprising said end annealing of said brazing sheet for 3 to 5 hours between 350° C. to 410° C.

7. The method according to claim 1, of producing an aluminium alloy brazing sheet such that in the end annealed as-produced condition said brazing sheet provides elongation values of greater than 10%, and yield strengths greater than 80 MPa.

8. The method according to claim 1, of producing an aluminium alloy brazing sheet such that in the end annealed as-produced condition said brazing sheet provides elongation values of greater than 15% and yield strengths greater the 90 MPa.

9. The method according to claim 1, wherein the mean grain diameter after brazing of said brazing sheet is greater than 80 μm.

10. The method according to claim 1, wherein the mean grain diameter after brazing of said brazing sheet is greater than 90 μm.

11. The method according to claim 1, wherein the amount (in weight %) of Cu in said core alloy is in a range of 0.15 to 0.7.

12. The method according to claim 1, wherein the amount (in weight %) of Mn in said core alloy is in a range of 0.6 to 1.5.

13. The method according to claim 1, wherein the amount (in weight %) of magnesium is less than 0.25%, silicon less than 0.80%, iron less than 0.60%, and titanium less than 0.25%.

14. The method according to claim 1, the amount (in weight %) of Si in said brazing alloy is in a range of 5 to 15%.

15. The method according to claim 1, the amount (in weight %) of Si in said brazing alloy is in a range of 6.5 to 11%.

16. The method according to claim 1, wherein a multi-clad ingot aluminium alloy is cast, and/or a rolled multi-clad product is produced, comprising:

a center core layer of said core aluminium alloy;

the center core layer has a cladding of said Al—Si based brazing alloy;

the center core layer has a cladding of aluminium manganese alloy;

an inter layer, having a composition selected from the group consisting of an AA7xxx-type alloy and a pure aluminium of an AA1xxx-type alloy, on one or both sides of the center core layer, thereby forming a multi-clad core aluminium alloy.

17. The method according to claim 16, wherein the aluminium manganese alloy cladding alloy has an AA3xxx-type composition.

18. The method according to claim 16, wherein the AA1xxx-type composition of the interlayer further comprises zinc.

19. The method according to claim 16, further comprising homogenizing and/or pre-heating said multi-clad core aluminium alloy after casting and cladding said multi-clad core aluminium alloy with the Al—Si based brazing alloy to obtain a clad member.

20. A multiclad assembly made according to the method of claim 16, comprising said interlayer on at least one side of the core layer of said brazing sheet, said interlayer comprising either a sacrificial anode material which is less corrosion resistant than the core layer or a protective material which is more corrosion resistant than the core layer.

21. A method for manufacturing heat exchanger components comprising brazing the multiclad assembly of claim 20.

22. The method for manufacturing of claim 21, wherein said heat exchanger components are selected from the group consisting of evaporator plates, oil cooler plates, roll formed tube, welded tube, header plates, side plates and corrugated and/or stamped heat transfer fins.

23. A method for manufacturing a heat exchanger comprising brazing the multiclad assembly of claim 20.

24. A multiclad assembly made according to the method of claim 1, wherein a multi-clad ingot aluminium alloy is cast, and/or a rolled multi-clad product is produced, comprising a four or five layered brazing sheet, comprising:

a center core layer of said core aluminium alloy, an interlayer on each side of the core layer; and a clad layer of said Al—Si alloy on at least one interlayer;

said interlayer comprising either a sacrificial anode material which is less corrosion resistant than the core layer or a protective material which is more corrosion resistant than the core layer, said interlayer having a composition selected from the group consisting of an AA7xxx-type alloy and a pure aluminium of an AA1xxx-type alloy.

25. A method of manufacturing heat exchanger components comprising brazing a brazing sheet manufactured using the method of claim 1.

26. The method of claim 25, wherein said heat exchanger components are selected from the group consisting of evaporator plates, oil cooler plates, roll formed tube, welded tube, header plates, side plates and corrugated and/or stamped heat transfer fins.

27. A method of manufacturing a heat exchanger comprising brazing a brazing sheet manufactured using the method of claim 1.

28. The method according to claim 1, wherein the cladding step comprises:

cladding said core aluminium alloy, one side, with the Al—Si based brazing alloy to obtain a clad member with a cladding thickness ratio in the range of 3-20%, and cladding said core alloy on the opposite side with an aluminium alloy with a cladding ratio of 5-30% and having a composition selected from the group consisting of AA3xxx-, AA7xxx- and AA1xxx-series aluminium alloys.

29. The method according to claim 28, wherein said brazing sheet in the end annealed condition and after stretching, forming and/or shaping and brazing said brazing sheet has a core penetration (LFM) depth of less than 40 μm.

30. The method according to claim 28, wherein said brazing sheet in the end annealed condition and after stretching, forming and/or shaping and brazing said brazing sheet has a core penetration (LFM) depth of less than 30 μm.

31. The method according to claim 28, comprising said strain hardening of the recrystallized annealed product to the second thickness with deformation between 12% and 25%.

32. The method according to claim 28, comprising said strain hardening of the recrystallized annealed product to the second thickness with deformation between 15% and 20%.

33. The method according to claim 28, comprising annealing said brazing sheet for 2 to 7 hours between 250 to 420° C., such that the end annealed product is not recrystallized and the mean grain diameter achieved in the recrystallization anneal is maintained at less than about 60 μm.

34. The method according to claim 28, comprising annealing said brazing sheet for 3 to 5 hours between 350° C. to 410° C., such that the end annealed product is not recrystallized and the mean grain diameter achieved in the recrystallization anneal is maintained at less than about 60 μm.

35. The method according to claim 28, wherein in the end annealed as-produced condition said brazing sheet provides elongation values of greater than 10%, and yield strengths greater than 80 MPa.

36. The method according to claim 28, wherein in the end annealed as-produced condition said brazing sheet provides elongation values of greater than 15%, and yield strengths greater than 90 MPa.

37. The method according to claim 28, wherein the mean grain diameter after brazing of said brazing sheet is greater than about 80 μm.

38. The method according to claim 28, wherein the mean grain diameter after brazing of said brazing sheet is greater than 90 μm.

39. The method according to claim 28, wherein the amount (in weight %) of Cu in said core alloy is in a range of 0.15 to 0.7%.

40. The method according to claim 28, wherein the amount (in weight %) of Mn in said core alloy is in a range of 0.6 to 1.5%.

41. The method according to claim 28, wherein the amount (in weight %) of magnesium is less than 0.25%, silicon less than 0.8%, iron less than 0.6%, and titanium less than 0.25%.

42. The method according to claim 28, wherein the amount (in weight %) of Si in said brazing alloy is in a range of 5 to 15%.

43. The method according to claim 28, wherein the amount (in weight %) of Si in said brazing alloy is in a range of 6.5 to 11%.

44. A method for manufacturing a heat exchanger component comprising brazing a brazing sheet manufactured using the method of claim 28.

45. The method of claim 44, wherein the heat exchanger component is selected from the group consisting of evaporator plates, oil cooler plates, roll formed tube, welded tube, header plate, side plates and corrugated and/or stamped heat transfer fins.

46. A method for manufacturing a heat exchanger comprising brazing a brazing sheet manufactured using the method of claim 28.

47. The method according to claim 1, wherein the core aluminium alloy consists of the following composition (in weight percent):

Cu: 0.06-1.25, Mn: 0.4-1.7, Mg: 0.6 max.,

Si: 1.25 max., Zn: 0.4 max., Zr: 0.25 max.,

Fe: 0.8 max., Ti: 0.3 max., Cr: 0.25 max., the balance aluminium and incidental elements and impurities as a core material.

48. The method according to claim 1, wherein the end annealing of step g) is carried out at between 357° C. to 420° C.

49. The method according to claim 1, wherein the end annealing of step g) is carried out at between 371° C. to 420° C.

50. The method according to claim 1, wherein the end annealing of step g) is carried out at between 385° C. to 420° C.

51. The method according to claim 1, wherein the end annealing of step g) is carried out at between 399° C. to 420° C.

52. The method according to claim 1, wherein the end annealing of step g) is carried out at between 413° C. to 420° C.

* * * * *